(12) United States Patent
Suetani

(10) Patent No.: US 10,659,651 B2
(45) Date of Patent: May 19, 2020

(54) SYSTEM, INFORMATION PROCESSING APPARATUS, CONTROL METHOD FOR INFORMATION PROCESSING APPARATUS, AND PROGRAM

(71) Applicant: CANON KABUSHIKI KAISHA, Tokyo (JP)

(72) Inventor: Yuki Suetani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/364,896

(22) Filed: Mar. 26, 2019

(65) Prior Publication Data

US 2019/0320086 A1    Oct. 17, 2019

(30) Foreign Application Priority Data

Apr. 13, 2018 (JP) ................. 2018-077651

(51) Int. Cl.
*H04N 1/32* (2006.01)
*H04N 1/00* (2006.01)
*G06F 3/12* (2006.01)

(52) U.S. Cl.
CPC ....... *H04N 1/32662* (2013.01); *G06F 3/1204* (2013.01); *G06F 3/1274* (2013.01); *G06F 3/1287* (2013.01); *H04N 1/00061* (2013.01)

(58) Field of Classification Search
CPC ............ H04N 1/32662; H04N 1/00061; G06F 3/1287; G06F 3/1274; G06F 3/1204

USPC ....................................... 358/1.15
See application file for complete search history.

(56) References Cited

U.S. PATENT DOCUMENTS

2018/0213020 A1* 7/2018 Kakutani ............ H04L 63/0428

FOREIGN PATENT DOCUMENTS

| JP | H11212874 A | 8/1999 |
|----|-------------|--------|
| JP | 2005208974 A | 8/2005 |

* cited by examiner

*Primary Examiner* — Mohammad H Ghayour
*Assistant Examiner* — Darryl V Dottin
(74) *Attorney, Agent, or Firm* — Carter, DeLuca & Farrell LLP

(57) ABSTRACT

An information processing apparatus that can appropriately delete data of an image forming apparatus used when remote support for an image forming apparatus is performed. The information processing apparatus provides remote support to an image forming apparatus through a relay server. For the remote support, the information processing apparatus acquires data used for remote support from the image forming apparatus through the relay server. The information processing apparatus controls execution of a deletion process of data cached in the information processing apparatus within the acquired data. In a preferable embodiment of the present invention, the information processing apparatus performs a deletion process of cache data when the remote support ends or when logged into the relay server.

9 Claims, 12 Drawing Sheets

SYSTEM, INFORMATION PROCESSING APPARATUS, CONTROL METHOD FOR INFORMATION PROCESSING APPARATUS, AND PROGRAM

BACKGROUND OF THE INVENTION

Field of the Invention

The present invention relates to a system and an information processing apparatus, a control method for an information processing apparatus, and a program, to provide a remote support service.

Description of the Related Art

As measures for troubleshooting problems in products become more complicated, processes in which customers directly inquire to call centers of manufacturers and receive responses are frequently performed. In Japanese Patent Laid-Open No. 2005-208974, in order for a call center to quickly respond when problems occur in an image forming apparatus, a remote support service using audio and video communication or a remote operation has been proposed. In the remote support service, when an error occurs in an image forming apparatus, a maintenance person does not go to the location, and an operator in the call center can directly transmit an error correction method to a user for correction. Therefore, it is possible to shorten a time for error correction.

In addition, regarding image forming apparatuses, those having functions of a server such as a web server and a file server are known. The user can use server functions of the image forming apparatus from a remote terminal via a network. One of such server functions is a web service called a remote user interface (RUI).

In the remote support service, due to the features of a service for customer support, an operator in the call center, for example, may use an RUI function of the above image forming apparatus to access customer information such as an address book and documents registered in the image forming apparatus. However, in consideration of customer information management, such customer information being cached and remaining in the information processing apparatus on the side of the call center is not desirable.

On the other hand, in data communication, in order to prevent received data from being cached in a data reception device, a function of a data transmission device processing header information of data in advance is known. This function is realized by, for example, adding a cache-control header (no-cache, no-store) to an HTTP response header. Japanese Patent Laid-Open No. H11-212874 discloses a communication method in which, in order to prevent data from being cached in a client application, a server system processes header information of data and then the data is transmitted to the client application.

However, in the technology in Japanese Patent Laid-Open No. H11-212874, during the remote support service, customer information may be cached and remain in the information processing apparatus on the side of the call center. This is because it cannot be said that all applications of the image forming apparatus have a function of processing header information of data as described above. In the remote support service, when the information processing apparatus on the side of the call center accesses data of an application having no function of processing header information, customer information included in the data may be cached and remain in the information processing apparatus.

SUMMARY OF THE INVENTION

An object of the present invention is to provide an information processing apparatus that can appropriately delete data of an image forming apparatus used when remote support for an image forming apparatus is performed.

An information processing apparatus according to one embodiment of the present invention is an information processing apparatus that can provide remote support to an image forming apparatus through a relay server, which includes an acquisition unit configured to acquire data used for remote support from the image forming apparatus through the relay server, and a control unit configured to control execution of a deletion process of the data that is acquired from the image forming apparatus and cached in the information processing apparatus, and the control unit performs the deletion process when a predetermined condition is satisfied.

According to the information processing apparatus of the present invention, it is possible to appropriately delete data of an image forming apparatus used when remote support for an image forming apparatus is performed.

Further features of the present invention will become apparent from the following description of exemplary embodiments (with reference to the attached drawings).

DESCRIPTION OF THE EMBODIMENTS

Forms for implementing the present invention will be described below with reference to the drawings.

First Embodiment

Figure 1:
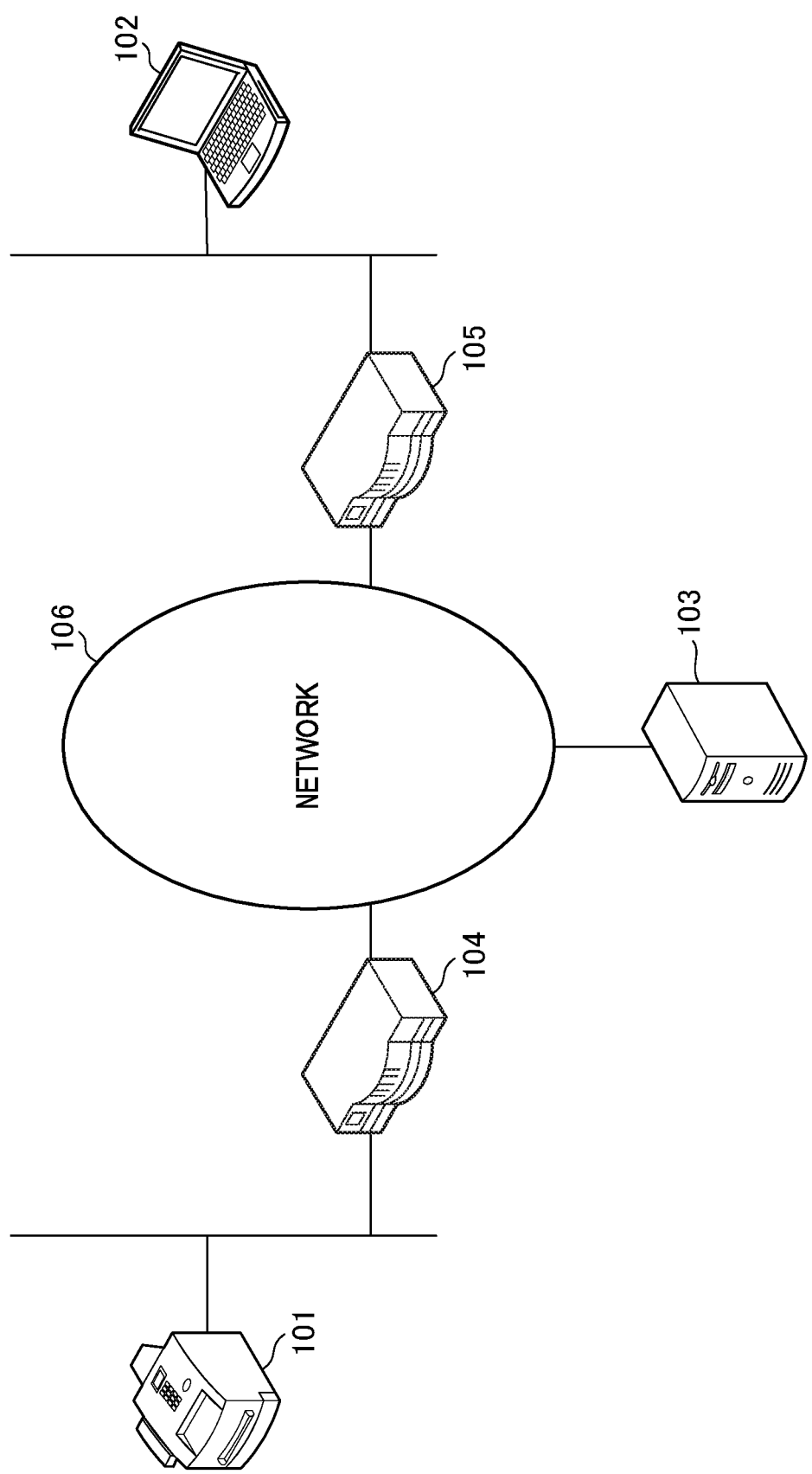
FIG. 1 is a diagram showing a network configuration example of a remote support system in embodiments of the present invention.

FIG. 1 is a diagram showing a network configuration of a remote support system according to a first embodiment of the present invention.

This system includes an image forming apparatus 101, an operator PC 102, a relay server 103, and firewalls (FW) 104 and 105. The devices can communicate each other via a network 106.

The image forming apparatus 101 and the operator PC 102 are devices to which the present invention is applied and operate as communication partners. The image forming apparatus 101 and the operator PC 102 have a data communication function of performing data communication based on a call control according to HyperText Transfer Protocol (HTTP).

In FIG. 1, the image forming apparatus 101 is connected to the network 106 through the firewall (FW) 104. The operator PC 102 on the side of a call center is connected to the network 106 through the FW 105. The relay server 103 is connected to the network 106.

In data communication according to HTTP, client nodes send a request message of "POST" (hereinafter referred to as a "POST request") as a request method or a request message of "GET" (hereinafter referred to as a "GET request") as a request method to a Uniform Resource Identifier (URI) provided from the relay server 103 and thus data communication is performed. Therefore, data communication can be performed even if client nodes are blocked by a private address area or an FW.

In the present embodiment, the image forming apparatus 101 and the operator PC 102 operate as HTTP client nodes. In addition, in the present embodiment, client nodes communicate with the network 106 with each other through an FW, but they may communicate with each other via a network with no FW. In addition, larger numbers of FWs, image forming apparatuses, and operator PCs than those shown in the drawing may be connected to the network 106. In addition, while HTTP is used as a communication protocol in the present embodiment, other communication protocols may be used.

Figure 2:
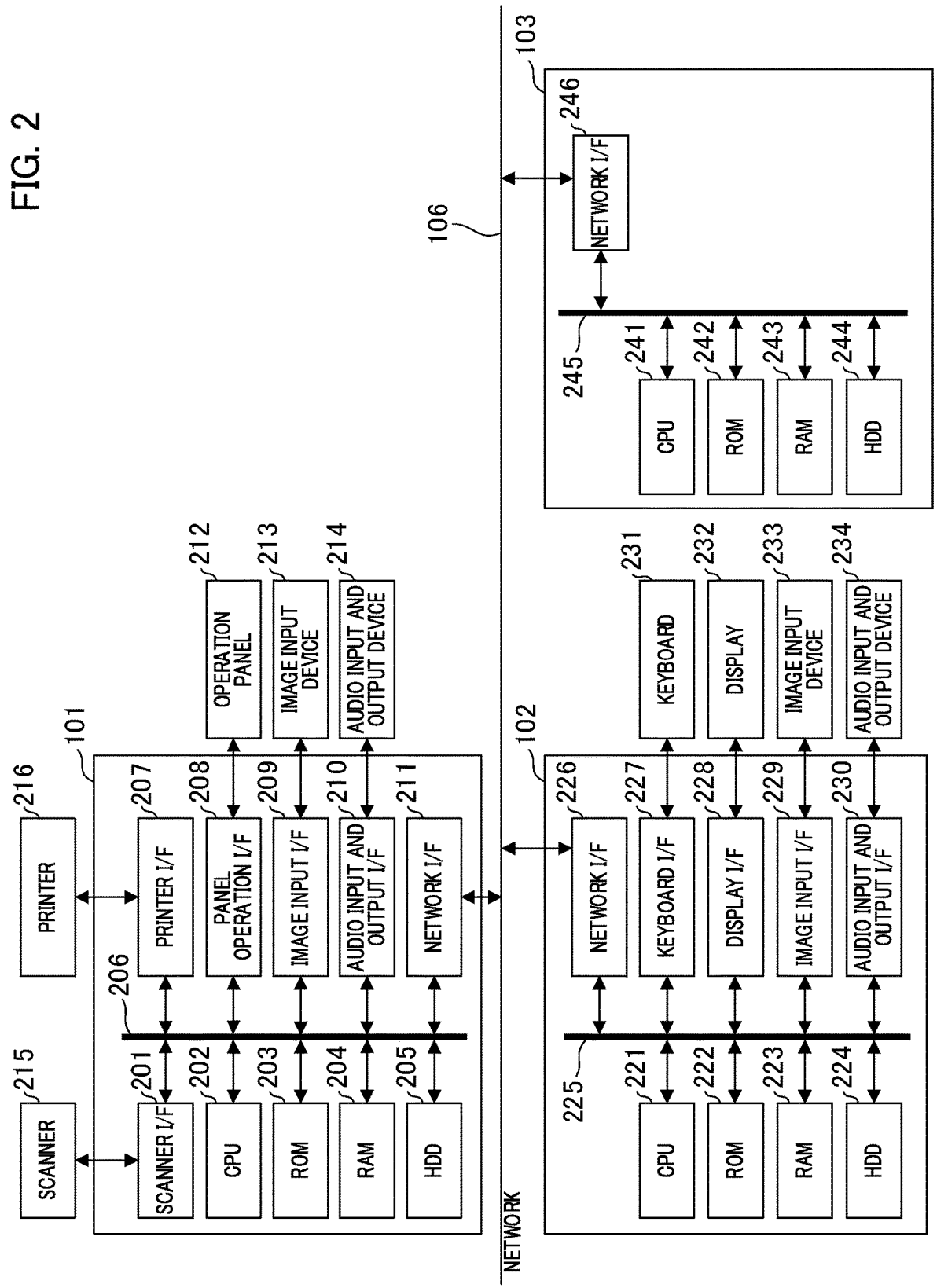
FIG. 2 is a diagram showing a hardware configuration example of a remote support system in embodiments.

FIG. 2 is a block diagram showing a hardware configuration of a remote support system according to the present embodiment. Here, in FIG. 2, the FWs 104 and 105 shown in FIG. 1 are omitted.

In the image forming apparatus 101, a CPU 202 comprehensively controls access to various devices connected to a system bus 206 based on a control program stored in a ROM 203 or a hard disk (HDD) 205.

A control program and the like that the CPU 202 can execute are stored in the ROM 203. A RAM 204 mainly functions as a main memory, a work area and the like of the CPU 202, and a memory capacity can be increased by an connecting an optional RAM to an extension port (not shown).

In the hard disk (HDD) 205, various types of data such as a boot program, various applications, font data, user files, and edit files are stored. Here, while the HDD 205 is used in the present embodiment, an external storage device such as an SD card and a flash memory may be used in place of the HDD 205.

A scanner I/F 201 controls an image input from a scanner 215. A printer I/F 207 controls an image output to a printer 216. A panel operation I/F 208 controls display of an operation panel 212 and also controls an input of various types of setting information showing details set in the operation panel 212.

An image input I/F 209 controls an image input from an image input device 213 such as a camera. An audio input and output I/F 210 controls an audio input and output of an audio input and output device 214 such as a headset. A network I/F 211 performs data communication with an external network through a network cable. Here, although not shown in FIG. 2, in the present embodiment, the network I/F 211 is connected to the network 106 through the FW 104 as shown in FIG. 1.

In the operator PC 102, a CPU 221 comprehensively controls access to various devices connected to a system bus 225 based on a control program stored in a ROM 222 or a hard disk (HDD) 224. In the ROM 222, a control program and the like the CPU 221 can execute are stored. A RAM 223 mainly functions as a main memory, a work area, and the like of the CPU 221, and a memory capacity can be increased by connecting an optional RAM to an extension port (not shown).

In the hard disk (HDD) 224, various types of data such as a boot program, various applications, font data, user files, and edit files are stored. Here, while the HDD 224 is used in the present embodiment, an external storage device such as an SD card and a flash memory may be used in place of the HDD 224. A network I/F 226 performs data communication with an external network through a network cable.

A keyboard I/F 227 controls a key input from a keyboard 231 and a pointing device (not shown). A display I/F 228 controls display of a display 232. An image input I/F 229 controls an image input from an image input device 233 such as a camera. An audio input and output I/F 230 controls an audio input and output of an audio input and output device 234 such as a headset.

In the relay server 103, a CPU 241 comprehensively controls access to various devices connected to a system bus 245 based on a control program stored in a ROM 242 or a hard disk (HDD) 244. In the ROM 242, a control program and the like that the CPU 241 can execute are stored. A RAM 243 mainly functions as a main memory, a work area and the like of the CPU 241, and a memory capacity can be increased when an optional RAM is connected to an extension port (not shown).

In the hard disk (HDD) 244, various types of data such as a boot program, various applications, font data, user files, and edit files are stored. Here, while the HDD 244 is used in the present embodiment, an external storage device such as an SD card and a flash memory may be used in place of the HDD 244. A network I/F 246 performs data communication with an external network through a network cable.

A flow of operations of the remote support system in the present embodiment will be described below.

In the remote support system, in the following order (1) to (4), the image forming apparatus 101, the operator PC 102, and the relay server 103 operate.

(1) The image forming apparatus 101 accesses (is connected to) the relay server 103 and waits for remote support.

(2) The operator PC 102 accesses (is connected to) the relay server 103 and starts remote support.

(3) When the image forming apparatus 101 is restarted, it accesses (is reconnected to) the relay server 103 again and waits for remote support.

(4) The operator PC 102 extends remote support and resumes remote support for the image forming apparatus 101.

Processes performed in the image forming apparatus 101, the operator PC 102, and the relay server 103 will be described below in further detail with reference to FIG. 3 to FIG. 5, FIG. 13, and FIG. 14.

Figure 3:
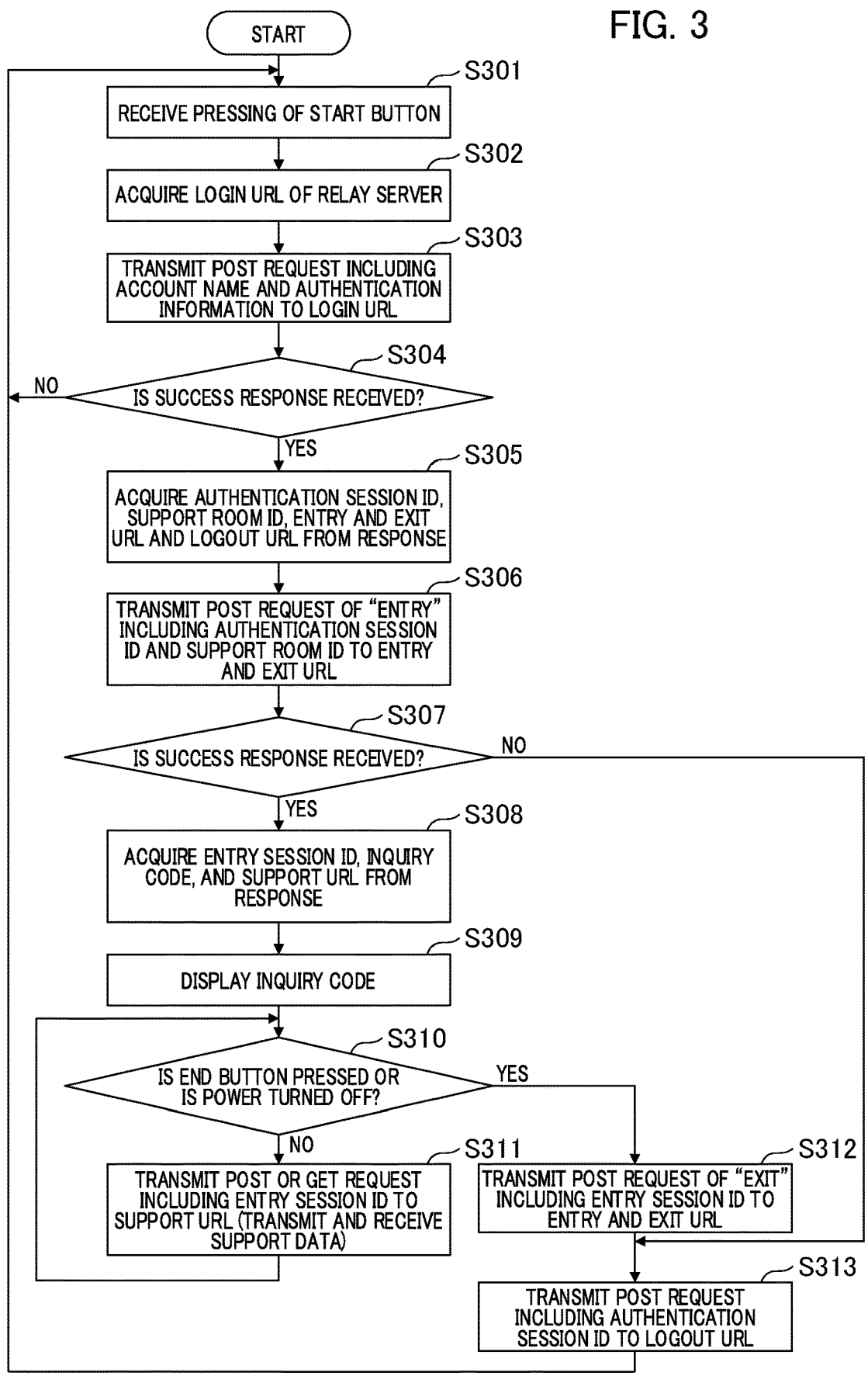
FIG. 3 is a flowchart showing procedures of a process performed in an image forming apparatus in embodiments.

FIG. 3 is a flowchart for explaining procedures of a specific process performed in the image forming apparatus 101.

Processes in steps shown in FIG. 3 are realized in the image forming apparatus 101 when the CPU 202 reads out a program stored in the HDD 205 to the RAM 204 and executes the program.

First, in Step S301, the image forming apparatus 101 receives pressing of a start button for remote support from a user. When the start button is pressed, the image forming apparatus 101 acquires a login URL of the relay server 103 in Step S302. The login URL may be registered in the image forming apparatus 101 in advance or may be acquired from an external information processing apparatus.

Next, in Step S303, the image forming apparatus 101 transmits a POST request including an account name and authentication information as parameters to the login URL. The POST request corresponds to a login request for requesting logging into the relay server 103. Here, authentication information is, for example, a password or a certificate. The account name and authentication information are registered in the image forming apparatus 101 in advance. The relay server 103 performs authentication (login process) based on the account name and authentication information included in the POST request transmitted from the image forming apparatus 101 and returns a response to the POST request.

In Step S304, the image forming apparatus 101 determines whether a success response indicating that the login process is successful has been received from the relay server 103. If a success response has been received, the image forming apparatus 101 advances the process to Step S305, and if a success response has not been received (when an error response indicating that the login process failed has been received), the image forming apparatus 101 returns the process to Step S301.

If the success response has been received, in Step S305, the image forming apparatus 101 acquires an authentication session ID, a support room ID, an entry and exit URL for a support room, and a logout URL, each of which is included in a response received from the relay server 103, from the response. The authentication session ID is a random character string indicating that authentication based on the account name and authentication information is successful.

In the present embodiment, the support room corresponds to a virtual space in a relay server that is used to relay communication for remote support between the image forming apparatus 101 and the operator PC 102. The relay server 103 manages a plurality of support rooms that can be allocated to the image forming apparatus 101 and the operator PC 102. The support room ID is identification information (ID) indicating such a support room.

Next, in Step S306, the image forming apparatus 101 transmits a POST request which includes an authentication session ID and a support room ID as parameters and in which "enter" is designated as a parameter to the entry and exit URL. The POST request is a request to the relay server 103, and is corresponding to an enter request (support start request) for requesting entry into a support room corresponding to the support room ID.

When a response for the POST request has been received from the relay server 103, in Step S307, the image forming apparatus 101 determines whether a success response indicating that entry into a support room corresponding to the transmitted support room ID is successful has been received. If the success response has been received, the image forming apparatus 101 advances the process to Step S308, and if the error response has been received, the image forming apparatus 101 advances the process to Step S313. In Step S313, the image forming apparatus 101 transmits a POST request including an authentication session ID as a parameter to the logout URL, and then returns the process to Step S301.

When the success response has been received, in Step S308, the image forming apparatus 101 acquires an entry session ID, an inquiry code, and a support URL from the response received from the relay server 103.

The entry session ID is a random character string indicating that entry into a support room in the relay server 103 is successful.

The inquiry code is a character string or a numeric string that is temporarily provided to the support room that the image forming apparatus 101 has entered, and is an example of a code indicating a support room to be used by the image forming apparatus 101 to receive remote support. The relay server 103 can identify a support room ID indicating the support room that the image forming apparatus 101 has entered from the inquiry code.

Next, in Step S309, the image forming apparatus 101 displays the inquiry code acquired in Step S308 on the operation panel 212. A user of the image forming apparatus 101 transmits the inquiry code displayed on the operation panel 212 to an operator who operates the operator PC 102 by means of a phone, an email, or the like. The operator of the operator PC 102 performs an operation for connecting the operator PC 102 to the relay server 103 using the inquiry code transmitted from the user of the image forming apparatus 101.

Therefore, the image forming apparatus 101 and the operator PC 102 enter the same support room in the relay server 103. As a result, remote support for the image forming apparatus 101 from the operator PC 102 is possible through the entered support room.

After remote support is started in this manner, in Step S310, the image forming apparatus 101 determines whether a user has performed an operation of pressing an end button of a remote support service or an operation of turning the power of the image forming apparatus 101 off (restarting).

Here, if the user performs a maintenance operation while operating the image forming apparatus 101, the user turns a power switch of the image forming apparatus 101 OFF and thereby an instruction to restart is issued to the image forming apparatus 101. On the other hand, if the operator PC 102 performs a maintenance operation while remotely operating the image forming apparatus 101, the operator PC 102 issues an instruction to restart to the image forming apparatus 101.

When the image forming apparatus 101 ends remote support or the power of the image forming apparatus 101 is turned off, the process advances to Step S312, and when remote support continues or the power has not been turned off, the process advances to Step S311.

In Step S311, the image forming apparatus 101 transmits a POST request or GET request including an entry session ID as a parameter to the support URL. The image forming apparatus repeats the process of Step S311 as long as "NO" is determined in Step S310.

The POST request or GET request corresponds to a transmission request and a reception request of support data from the relay server 103. Therefore, the image forming apparatus 101 transmits and receives support data to and from the relay server 103 through the entered support room.

That is, the image forming apparatus 101 transmits and receives support data to and from the operator PC 102 through the relay server 103. Here, the support data is, for example, audio data, video data, or data of a virtual network computing (VNC) protocol which is a protocol for a remote operation. When the image forming apparatus 101 transmits and receives such support data, support (remote support) according to audio and video communication, or remote operation support from the operator PC 102 can thereby be received and a maintenance operation of the image forming apparatus 101 according to remote support can be performed.

In the image forming apparatus, when "YES" is determined in Step S310, next, in Step S312, the image forming apparatus 101 transmits a POST request which includes an entry session ID as a parameter and "exit" is designated as a parameter to the entry and exit URL. The POST request is a request to the relay server 103 and is corresponding to an exit request (support end request) for requesting exit from the entered support room.

Then, in Step S313, the image forming apparatus 101 transmits a POST request including an authentication session ID as a parameter to the logout URL, and returns the process to Step S301. After Step S313, in the case the image forming apparatus 101 restarts, the image forming apparatus 101 returns the process to Step S301 after the restart.

Here, when the image forming apparatus 101 is restarted, a connection (session) established between the image forming apparatus 101 and the relay server 103 is temporarily disconnected. When remote support by the operator PC 102 is resumed after the image forming apparatus 101 is restarted, a reconnection to the relay server 103 is performed (S302 to S309) after the image forming apparatus 101 receives a remote support start instruction from the user (S301). Therefore, a new connection (session) between the image forming apparatus 101 and the relay server 103 is established.

Figure 4:
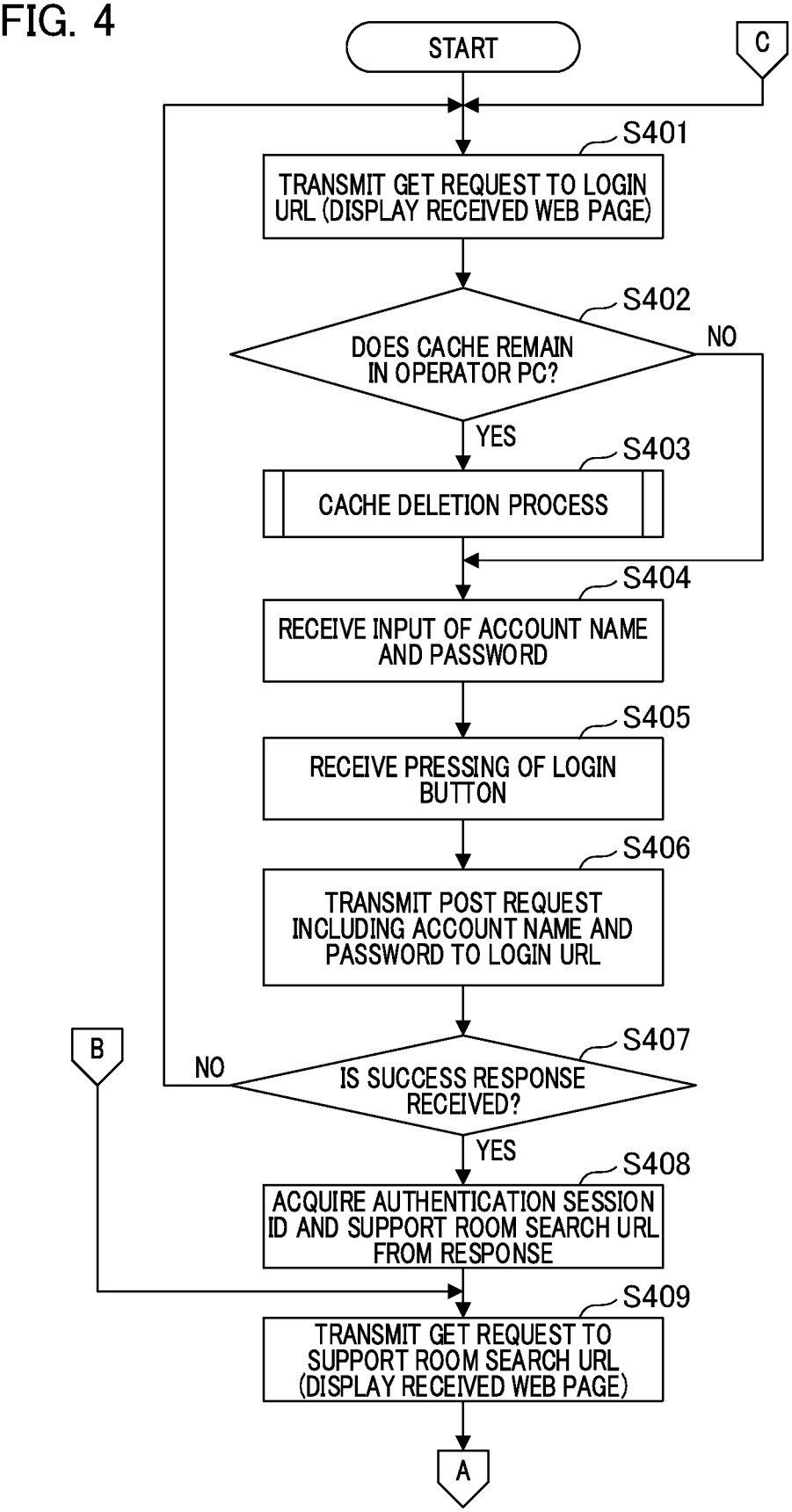
FIG. 4 is a flowchart showing procedures of a process performed in an operator PC in embodiments.
Figure 5:
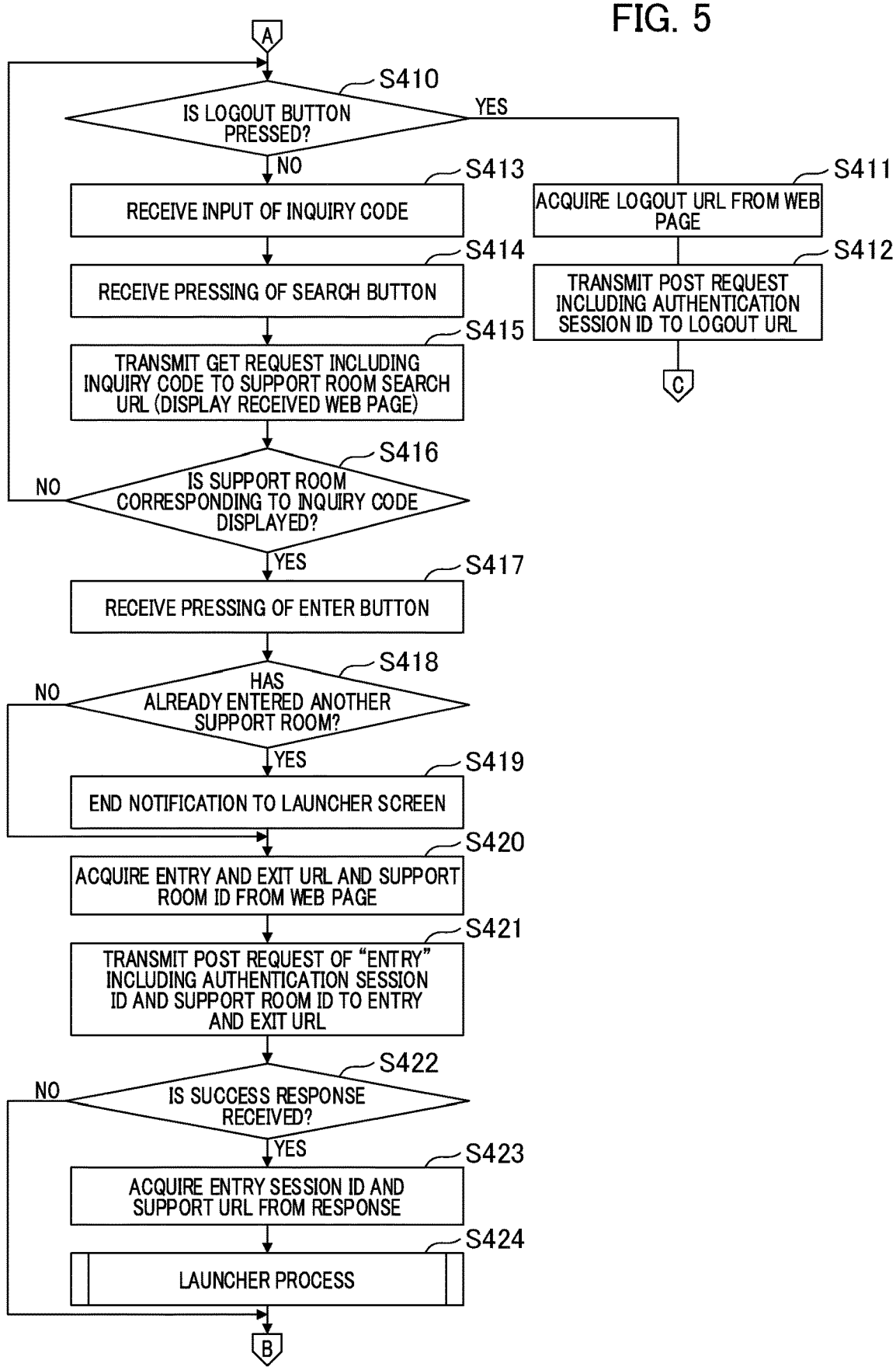
FIG. 5 is a flowchart showing procedures of a process performed in an operator PC in embodiments.

FIG. 4 and FIG. 5 are flowcharts for explaining procedures of a specific process performed in the operator PC 102.

The processes of steps shown in FIG. 4 and FIG. 5 are realized in the operator PC 102 when the CPU 221 reads a program stored in the HDD 224 in the RAM 223 and executes the program.

First, in Step S401, the operator PC 102 transmits a GET request to a login URL in the relay server 103 and thereby receives a web page (login screen) of the URL from the relay server 103, and displays it on the display 232. Here, screen display on the operator PC 102 is performed by a web browser that is operating in the operator PC 102. The login URL may be designated by direct input to an address field on a web browser screen displayed on the display 232 or may be designated using a bookmark or the like.

Figure 9:
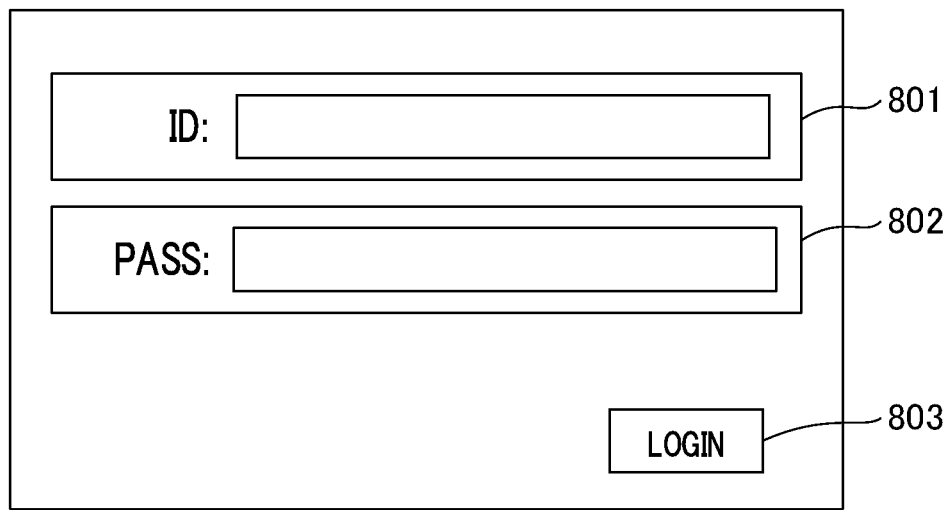
FIG. 9 is a diagram showing an example of a web page for logging into a relay server in embodiments.

FIG. 9 is a diagram showing an example of a screen for logging into the relay server 103, which is displayed on the display 232 of the operator PC 102 according to the process of Step S401.

On the login screen shown in FIG. 9, a field 801 is a field for inputting an account name (ID) for logging into the relay server 103. The field 802 is a field for inputting authentication information (password). A login button 803 is a button for instructing execution of login.

The description will return to FIG. 4 and FIG. 5. Next, in Step S402, the operator PC 102 determines whether a cache file remains in the operator PC 102. If a cache file remains, the operator PC advances the process to Step S403, and if no cache file remains, the operator PC advances the process to Step S404.

In Step S403, the operator PC 102 performs a cache deletion process to be described below with reference to FIG. 7. Determination in Step S402 and the process of Step S403 are processes prepared for a case that deletion of a cache file is not performed in a cache deletion process performed at a timing at which a remote support service to be described below ends. According to this process, when the operator PC 102 logins into the relay server 103 next time, the cache file is deleted.

Next, in Step S404, the operator PC 102 receives inputs of an account name (an ID and the field 801) and authentication information (a password and the field 802) on the login screen (FIG. 9) displayed in Step S401. In addition, in Step S405, the operator PC 102 receives pressing of the login button 803 on the login screen (FIG. 9) displayed in Step S401.

When the login button 803 is pressed, in Step S406, the operator PC 102 transmits a POST request including an account name (ID) and authentication information (password) as parameters to the login URL. The POST request corresponds to a login request for requesting logging into the relay server 103.

The relay server 103 performs authentication (login process) based on the account name (ID) and the authentication information (password) included in the POST request transmitted from the operator PC 102 and returns a response for the POST request. In Step S407, the operator PC 102 determines whether a success response indicating that the login process is successful has been received from the relay server 103. If the success response has been received, the operator PC 102 advances the process to Step S408, and if no success response has been received (when an error response indicating that the login process failed is receive), the operator PC 102 returns the process to Step S401.

IF the success response has been received, in Step S408, the operator PC 102 acquires the authentication session ID and support room search URL included in the response received from the relay server 103. Next, in Step S409, the operator PC 102 transmits a GET request including an authentication session ID as a parameter to the support room search URL and thereby receives a web page (search screen) of the URL from the relay server 103, and displays it on the display 232. The web page is a page for an operator of the operator PC 102 to search for a specific support room from among a plurality of support rooms in the relay server 103.

Figure 10:
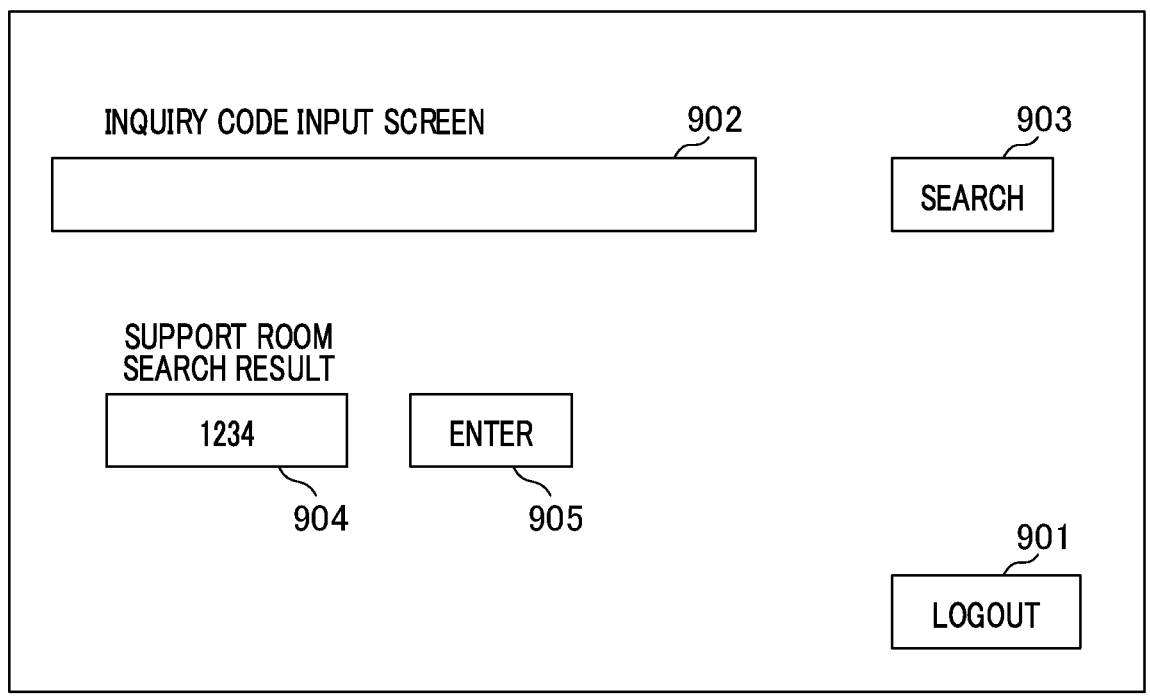
FIG. 10 is a diagram showing an example of a web page for searching for a support room in embodiments.

FIG. 10 is a diagram showing an example of a search screen displayed on the display 232 of the operator PC 102 according to the process of Step S409.

On the search screen shown in FIG. 10, a logout button 901 is a button for instructing execution of logout from the logged in account. A field 902 is a field for inputting an inquiry code. A search button 903 is a button for instructing execution of search for a support room with the inquiry code input to the field 902.

In an area 904, a result of the process performed in response to pressing of the search button 903 is displayed. FIG. 10 shows an example in which the result of the process is displayed and an ID ("1234") of the found support room is displayed. When the support room ID is displayed in the area 904, an area 905 functions as an enter button for instructing entry into a support room indicated by the support room ID. Here, when no support room ID is displayed in the area 904, nothing is displayed in the area 905, and the area 905 does not function as an enter button.

The description will return to FIG. 4 and FIG. 5. After display of a web page (search screen) starts in Step S409, in Step S410, the operator PC 102 determines whether pressing of the logout button 901 has been received. IF pressing of the logout button 901 has been received, the operator PC 102 advances the process to Step S411.

In Step S411, the operator PC 102 acquires a logout URL from the response (web page) received in Step S409. Then, in Step S412, the operator PC 102 transmits a POST request including an authentication session ID to the acquired logout URL and thus logs out from the relay server 103, and returns the process to Step S401.

On the other hand, if pressing of the logout button 901 has not been received in Step S410, the operator PC 102 advances the process to Step S413.

In Step S413 to Step S421, the operator PC 102 performs a process of requesting remote support start using the inquiry code transmitted from the user of the image forming apparatus 101 to the operator of the operator PC 102.

First, in Step S413, the operator PC 102 receives an input of the inquiry code. Specifically, an input of the inquiry code to the field 902 on the search screen shown in FIG. 10 has been received.

Then, in Step S414, the operator PC 102 receives pressing of the search button 903 on the search screen shown in FIG. 10. When pressing of the search button 903 has been received, next, in Step S415, the operator PC 102 transmits a GET request including an inquiry code as a parameter (that is, a GET request of "search") to the support room search URL. Therefore, the operator PC 102 displays the web page received from the relay server 103 in response to the GET request on the display 232.

Next, in Step S416, the operator PC 102 determines whether a support room (that is, the found result) corresponding to the inquiry code transmitted to the relay server 103 in Step S415 is displayed on the web page (search screen). This determination corresponds to a determination of whether a support room (support room ID) corresponding to the transmitted inquiry code is obtained as a result found by the relay server 103.

When any support room is obtained as the found result, as shown in FIG. 10, an ID of the found support room is displayed on the area 904, and "enter" is displayed in the area 905.

In Step S416, if no found result is displayed, the operator PC 102 returns the process to Step S410, and when the found result is displayed, the operator PC 102 advances the process to Step S417.

In Step S417, the operator PC 102 receives pressing of the enter button (the area 905 in FIG. 10). When pressing of the enter button has been received, in Step S418, the operator PC 102 determines whether it has already entered another support room different from the support room corresponding to the pressed enter button. The operator PC 102 advances the process to Step S419 when it has entered another support room, and advances the process to Step S420 when it has not already entered another support room.

In Step S419, the operator PC 102 performs a process of exiting from the support room that it has entered (refer to FIG. 6 to be described below). Therefore, the operator PC 102 exits from the support room that it has already entered, and enters a new support room, that is, a support room corresponding to the inquiry code transmitted to the relay server 103 in Step S415.

Next, in Step S420, the operator PC 102 acquires the entry and exit URL and the support room ID from the response (web page) received in Step S415. Next, in Step S421, the operator PC 102 transmits a POST request which includes an authentication session ID and a support room ID as parameters and in which "enter" is designated as a parameter to the entry and exit URL. This POST request is a request to the relay server 103 and is corresponding to an enter request (support start request) for requesting entry into a support room corresponding to the support room ID.

When a response for the POST request has been received from the relay server 103, in Step S422, the operator PC 102 determines whether a success response indicating that entry into a support room corresponding to the transmitted support room ID is successful has been received. If the success response has been received, the operator PC 102 advances the process to Step S423, and when the error response has been received, the operator PC 102 returns the process to Step S409.

When the success response has been received, in Step S423, the operator PC 102 acquires an entry session ID and a support URL from the response received from the relay server 103. Therefore, the operator PC 102 can transmit and receive support data to and from the image forming apparatus 101 through the entered support room (through the relay server 103) and can perform a maintenance operation and the like of the image forming apparatus 101 according to remote support.

Then, in Step 424, the operator PC 102 performs a launcher process to be described below. The launcher process includes a process of the operator PC 102 displaying a remote screen for providing remote support to the image forming apparatus 101 through the entered support room and a process of exiting from the entered support room. The operator PC 102 performs the launcher process in Step S424 and then returns the process to Step S409.

Figure 6:
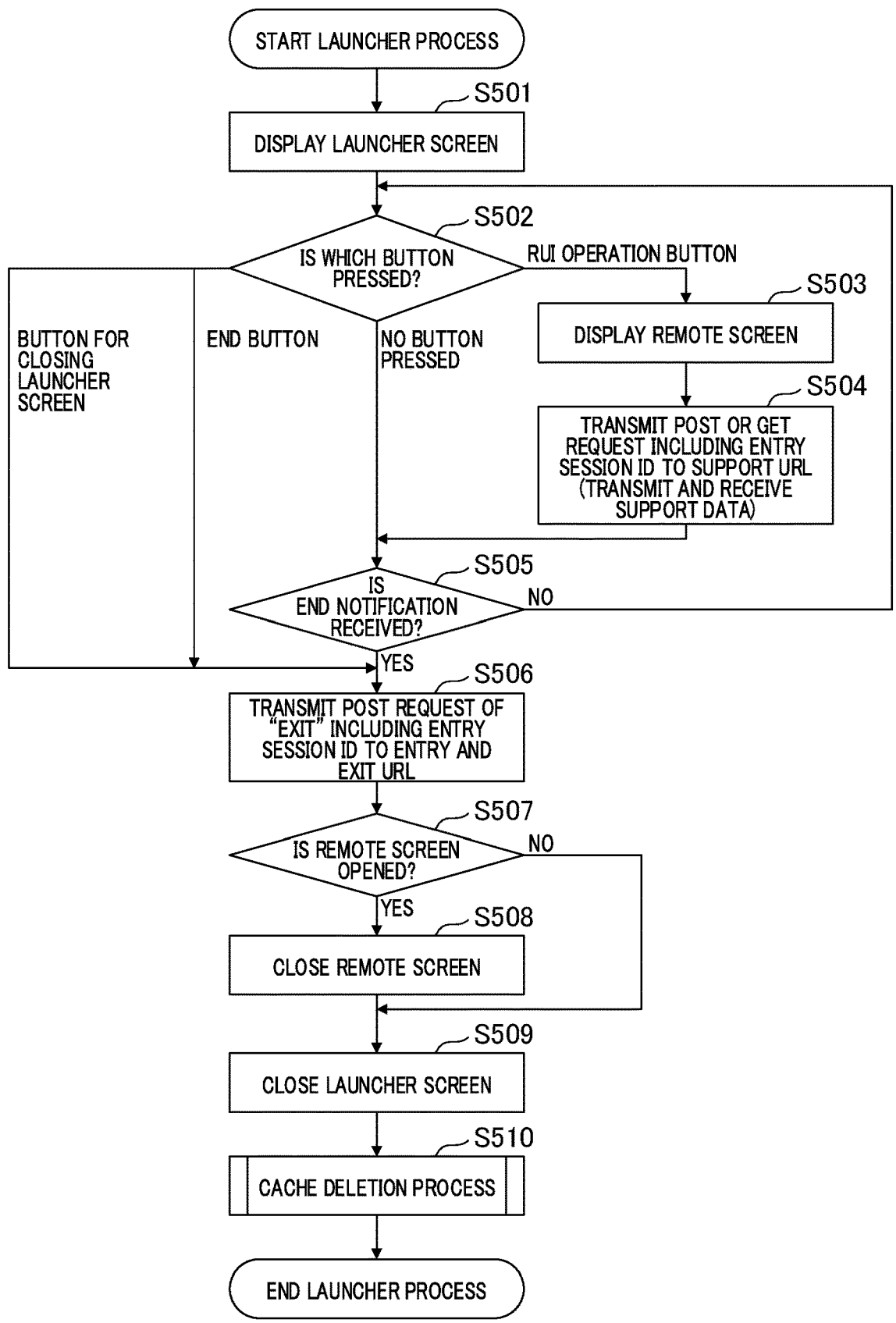
FIG. 6 is a flowchart showing procedures of a launcher process performed in an operator PC in embodiments.

FIG. 6 is a flowchart for explaining procedures of a specific process in the launcher process (Step S424 in FIG. 5) performed in the operator PC 102.

The process of steps shown in FIG. 6 is realized in the operator PC 102 when the CPU 221 reads out a program stored in the HDD 224 to the RAM 223 and executes the program.

First, in Step S501, the operator PC 102 displays a launcher screen (web page). Here, the launcher screen is displayed on a window separate from that of the login screen (FIG. 9) and the search screen (FIG. 10). Here, when the launcher screen is displayed, a connection between the image forming apparatus 101 and the operator PC 102 is established through the relay server 103.

Figure 11:
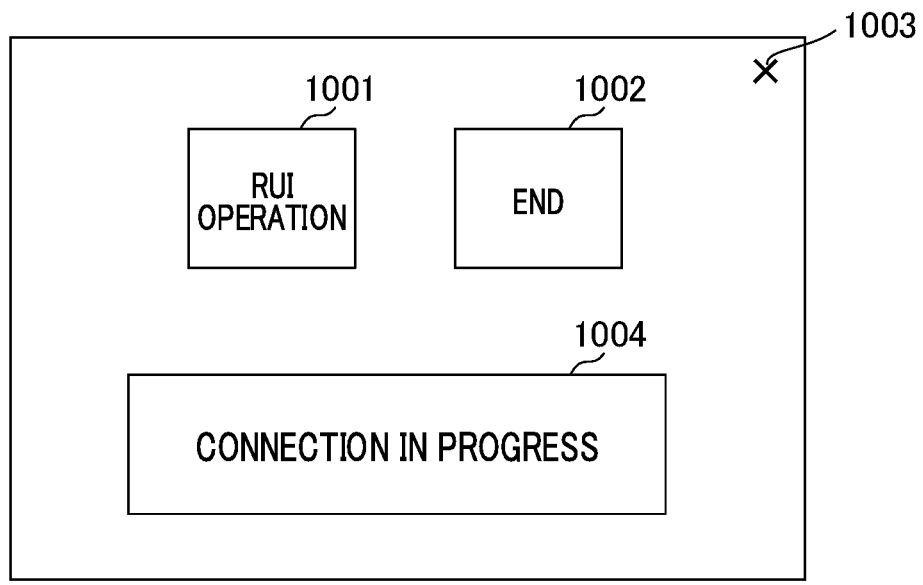
FIG. 11 is a diagram showing an example of a launcher screen displayed after entry into a support room in embodiments.

FIG. 11 is a diagram showing an example of a launcher screen displayed on the display 232 of the operator PC 102 according to the process of Step S501.

On the launcher screen shown in FIG. 11, an RUI operation button 1001 is a button for instructing display of a remote screen (remote user interface: RUI) for remotely operating the image forming apparatus 101 from the operator PC 102.

An end button 1002 is a button for transmitting an exit request for requesting exit from the entered support room to the entry and exit URL. A close button 1003 is a button for closing the launcher screen and in the same manner as in the end button 1002, an exit request for requesting exit from the entered support room is transmitted to the entry and exit URL. In an area 1004, information indicating a connection state between the image forming apparatus 101 and the operator PC 102 is displayed.

FIG. 11 shows an example in which information indicating that a connection between the image forming apparatus 101 and the operator PC 102 is established through the relay server 103 is displayed, and shows "connection in progress." Here, any type of display may be performed on the launcher screen as long as a connection state between the image forming apparatus 101 and the operator PC 102 is displayed.

The description will return to FIG. 6. After display of the launcher screen starts, in Step S502, if pressing of the RUI operation button 1001 has been received, the operator PC 102 advances the process to Step S503, and displays the remote screen (web page) as a separate window. Details of the remote screen will be described below with reference to FIG. 12. The remote screen is a screen that the operator PC 102 uses when it provides remote support to the image forming apparatus 101.

Here, in the present embodiment, when entry into the support room is successful in Steps S421 to S422, and the process shown in FIG. 6 starts, the remote screen is displayed after the launcher screen (FIG. 11) is displayed. However, the present invention is not limited thereto. For example, the remote screen may be displayed without displaying the launcher screen. That is, display on the launcher screen and an operation corresponding thereto may be realized on the remote screen.

For example, the end button 1002 for exit from the support room may be provided on the remote screen. In addition, when a close button (not shown) is operated on the remote screen in FIG. 12, in the same manner as in the close button 1003 on the launcher screen, exit from the support room may be performed. In this case, in the process in FIG. 6, an RUI screen is displayed in Step S501, and in Step S502, it may be determined whether which type of operation is performed on the RUI screen.

Then, in Step S504, the operator PC 102 transmits a POST request or GET request including an entry session ID as a parameter to the support URL. Therefore, the operator PC 102 transmits and receives support data to and from the relay server 103 through the entered support room.

That is, the operator PC 102 transmits and receives support data to and from the image forming apparatus 101 through the relay server 103. The operator PC 102 transmits and receives such support data, and thus can provide support (remote support) according to audio and video communication, or a remote operation to the image forming apparatus 101, and can perform a maintenance operation of the image forming apparatus 101 according to remote support.

Figure 12:
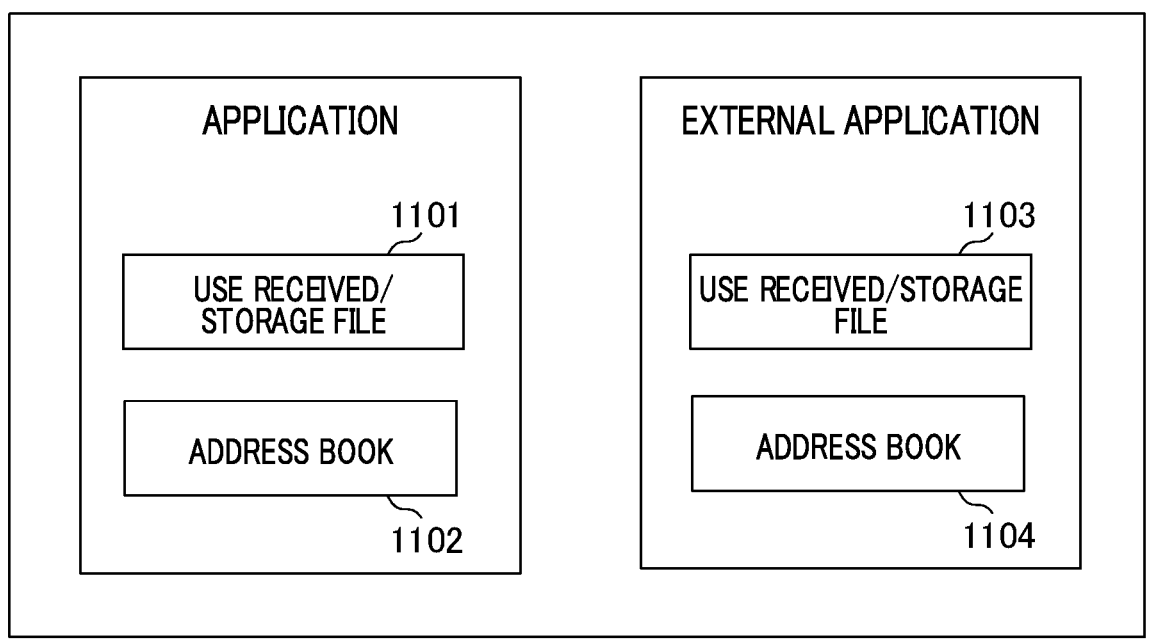
FIG. 12 is a diagram showing an example of a remote screen displayed when a remote support is used in embodiments.

FIG. 12 is a diagram showing an example of a remote screen (RUI) displayed on the display 232 of the operator PC 102 according to the process of Step S503.

In the present embodiment, the image forming apparatus 101 can execute a native application and an external application. The native application is an application that is executed using information that the image forming apparatus 101 holds in advance. In the present embodiment, in header information of data acquired in the native application, information for preventing the data from being cached is added.

Specifically, a cache-control header (no-cache, no-store) for controlling a cache is added as an HTTP response header. Therefore, it is possible to cause the browser of the operator PC 102 to execute an instruction "Do not use the cache without confirmation in an origin server," or "Do not store any request or response."

On the other hand, the external application is a web application (external application) executed using information acquired from a web server (not shown) which is an external device. Since the external application may be created by a third party, information for preventing the data from being cached is not necessarily added to header information of data acquired from the web server. Therefore, the operator PC 102 performs a cache process to be described below (FIG. 7) so that the cached data does not remain in the device itself.

On the remote screen shown in FIG. 12, a button 1101 is a button for accessing data held in an internal application. A button 1102 is a button for accessing an address book held in the internal application. A button 1103 is a button for accessing data held in an external application. In addition, a button 1104 is a button for accessing an address book held in the external application.

The description will return to FIG. 6. In Step S502, if pressing of the end button 1002 or the close button 1003 has been received, the operator PC 102 advances the process to Step S506. On the other hand, in Step S502, if no pressing of the buttons has been received, the operator PC 102 advances the process to Step S505. In Step S505, the operator PC 102 determines whether an end notification has been received. If the end notification has been received, the operator PC 102 advances the process to Step S506, and if the end notification has not been received, the operator PC 102 returns the process to Step S502.

In this manner, the operator PC 102 repeatedly performs the processes of Steps S503 and S504 until pressing of the end button 1002 or the close button 1003 has been received or the end notification has been received. On the other hand, when pressing of the end button 1002 or the close button 1003 has been received or the end notification has been received, the operator PC 102 advances the process to Step S506.

In Step S506, the operator PC 102 transmits a POST request which includes an entry session ID as a parameter and in which "exit" is designated as a parameter to the entry and exit URL. The POST request is a request to the relay server 103 and is corresponding to an exit request (support end request) for requesting exit from the entered support room. Then, the operator PC 102 advances the process to Step S507.

In Step S507, the operator PC 102 determines whether the remote screen is opened. If the remote screen is opened, the process advances to Step S508, and if the remote screen is closed, the process advances to Step S509. In Step S508, the operator PC 102 closes the remote screen that is opened.

In Step S509, the operator PC 102 closes the launcher screen (FIG. 11). Then, in Step S510, the operator PC 102 performs a cache deletion process to be described below with reference to FIG. 7 and ends the launcher process shown in FIG. 6 (that is, Step S424 in FIG. 5). That is, when the operator PC 102 ends remote support and exits from the support room, it deletes data cached in association with the remote support. Then, the operator PC 102 returns the process to Step 409 in FIG. 4.

Figure 7:
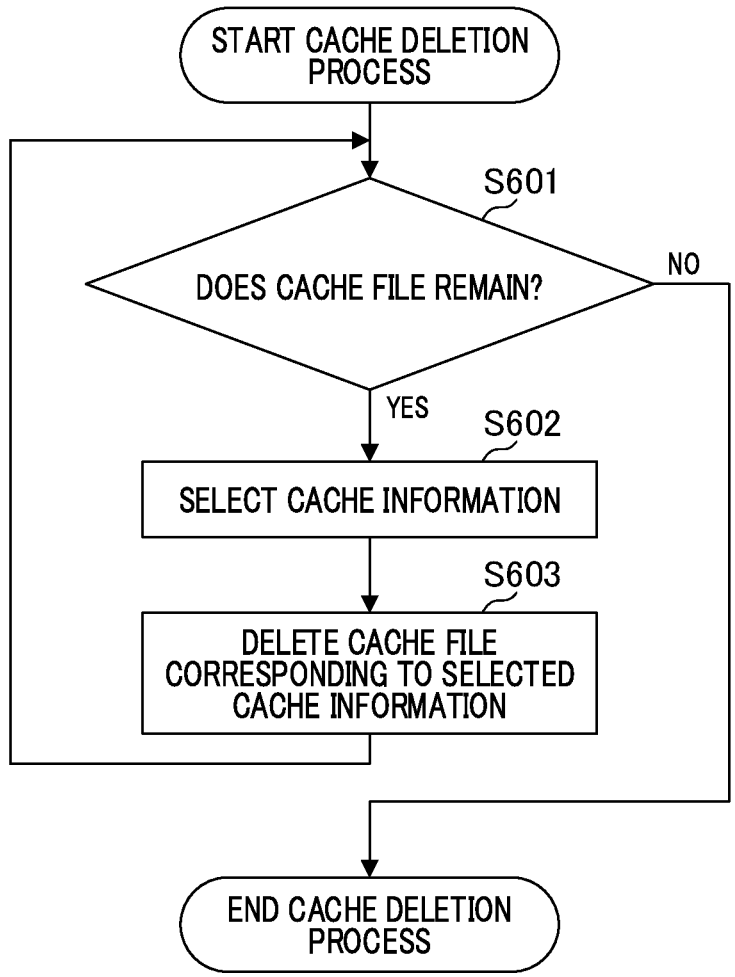
FIG. 7 is a flowchart showing procedures of a cache deletion process performed in an operator PC in a first embodiment.

FIG. 7 is a flowchart for explaining procedures of a cache deletion process performed in the operator PC 102.

The cache deletion process is performed at any timing of the following timings.

One timing is a timing at which the operator PC 102 ends a remote support service. The cache deletion process corresponds to Step S510 shown in FIG. 6.

Another timing is a timing at which the remote support service abnormally ends and logging into the relay server 103 is then performed again. This cache deletion process corresponds to Step S403 shown in FIG. 4.

The remote support service ends when the operator PC 102 exits from the entered support room. Examples of an operation for exit include an operation of pressing the end button 1002 or the close button 1003 on the launcher screen (FIG. 11). In addition, even when an operation of entry into another support room is performed while the operator PC 102 enters any support room, an end notification indicating that the operator PC 102 exits from the support room that it has entered previously is displayed, and a remote support service through the support room ends.

Switching to another support room is performed, for example, when the image forming apparatus 101 under remote support is restarted. In addition, switching to another support room is also performed when the operator PC 102 searches for another new support room using the screen for searching for the support room (FIG. 10), and an enter button corresponding to the found support room (the area 905 in FIG. 10) is pressed (Step S419).

The process of steps shown in FIG. 7 is realized in the operator PC 102 when the CPU 221 reads out a program stored in the HDD 224 to the RAM 223 and executes the program.

As described above, the operator PC 102 performs the cache deletion process in Step S510 or S403.

In the cache deletion process, first, in Step S601, the operator PC 102 determines whether a cache file remains in a predetermined folder in which cache files are stored.

As a folder in which cache files are stored, for example, a "temporary internet files" folder and the like are used. If a cache file remains in a storage folder, the operator PC 102 advances the process to Step S602, and if no cache file remains, the operator PC 102 ends the process.

In Step S602, the operator PC 102 selects one cache information item from among cache information items about remaining cache files. Next, in Step S603, the operator PC 102 deletes the cache file corresponding to the selected cache information item. Then, the operator PC 102 returns the process to Step S601. Then, the operator PC 102 repeats the processes of Steps S601 to S603 until all cache files remaining in the predetermined folder are deleted.

Figure 13:
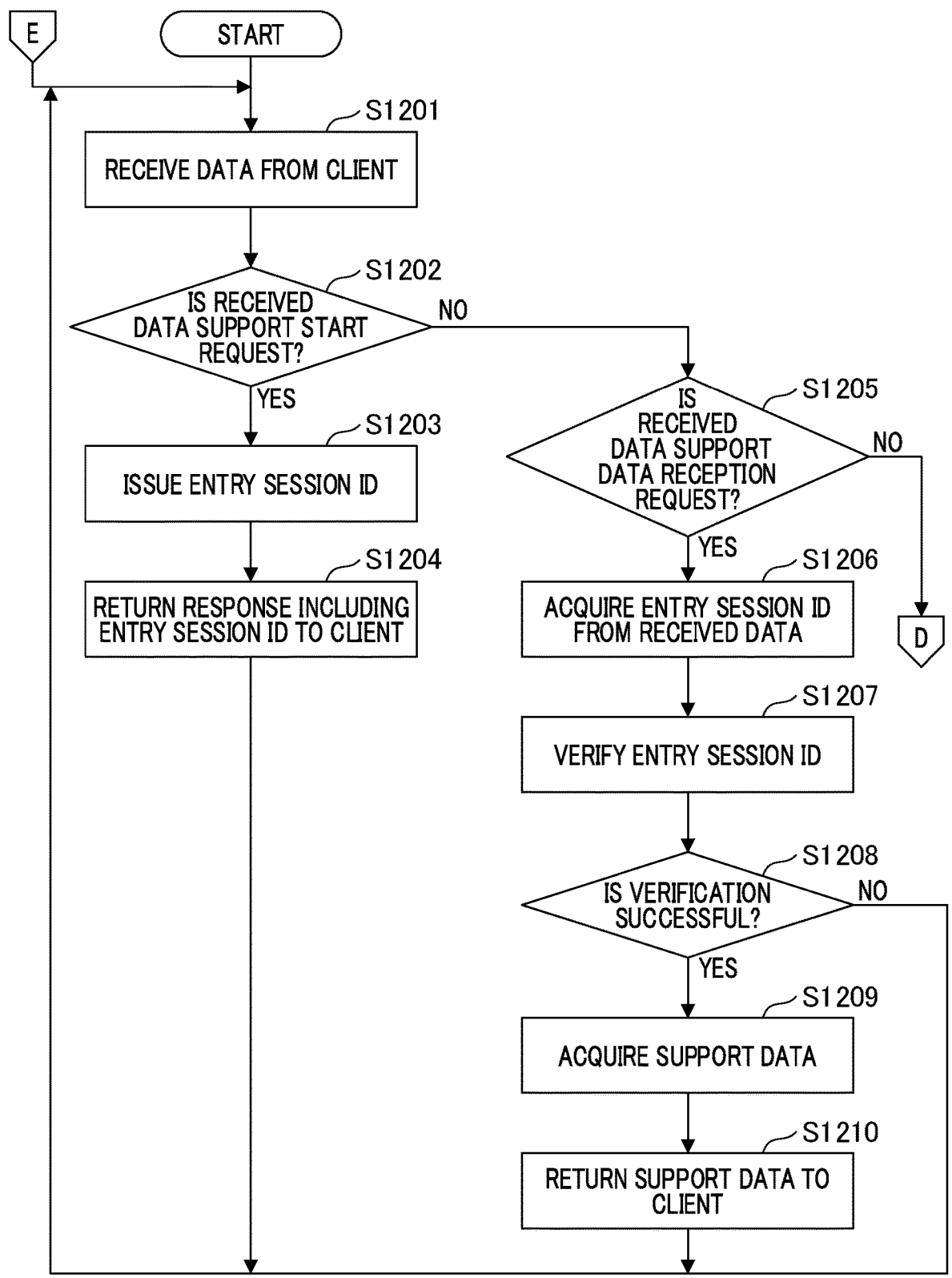
FIG. 13 is a flowchart showing procedures of a process performed in a relay server in embodiments.
Figure 14:
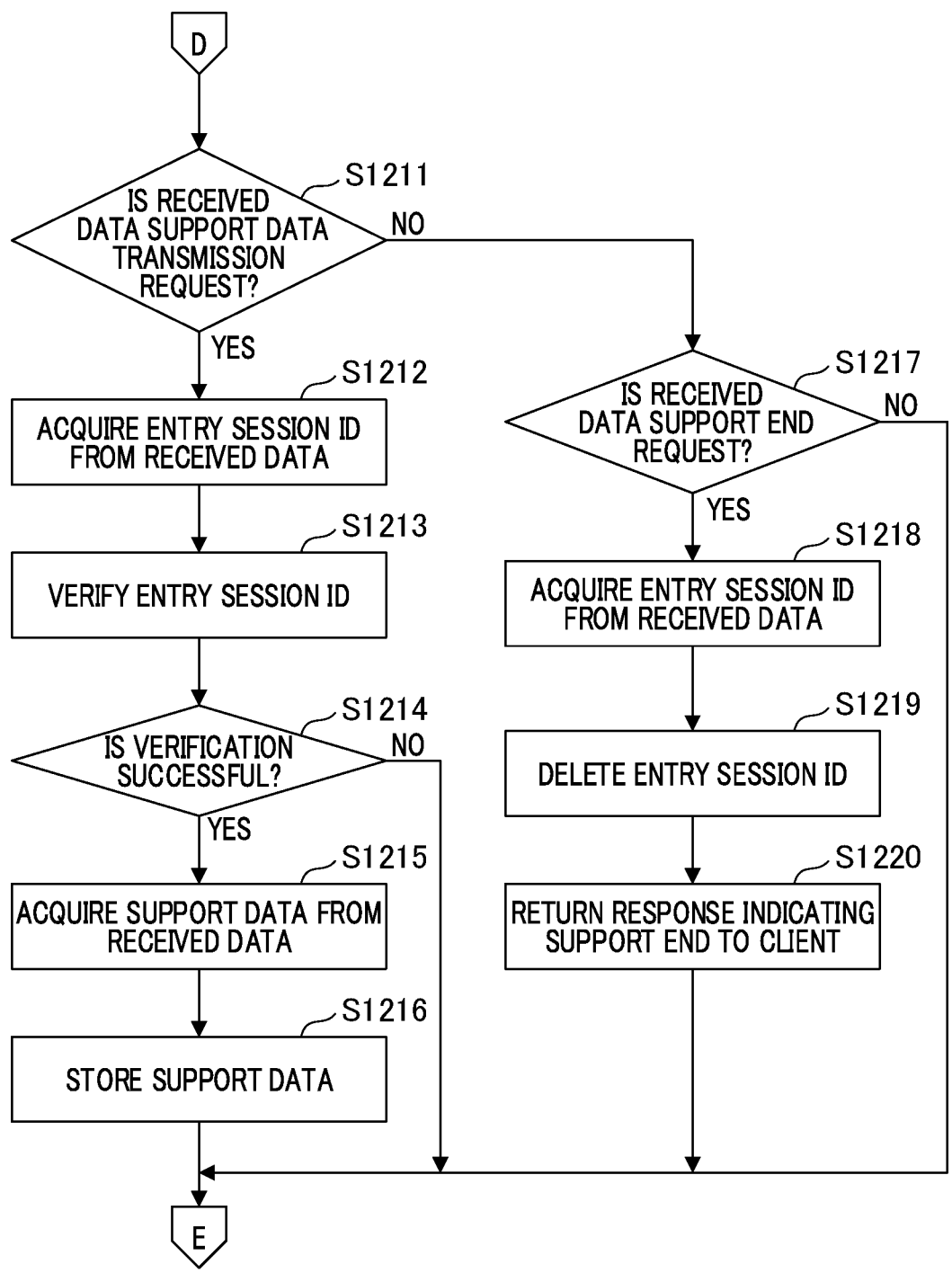
FIG. 14 is a flowchart showing procedures of a process performed in a relay server in embodiments.

FIG. 13 and FIG. 14 are flowcharts for explaining procedures of a specific process performed in the relay server 103.

Processes of steps shown in FIG. 13 and FIG. 14 are realized in the relay server 103 when the CPU 241 reads out a program stored in the HDD 244 to the RAM 243 and executes the program.

Here, in the present embodiment, header information included in the response of the relay server 103 is processed so that data of the image forming apparatus 101 is not cached. For example, in the case of an HTTP response, a cache-control header (no-cache, no-store) for controlling a cache is added to the header information. Therefore, it is possible to cause the web browser that is operating in the operator PC 102 to execute an instruction "Do not use the cache without confirmation in an origin server," or "Do not store any request or response."

First, in Step S1201, the relay server 103 receives data from the image forming apparatus 101 or the operator PC 102, each of which is a client (HTTP client). Then, in Steps S1202, S1205, S1211, and S1217, the relay server 103 determines a type of the request included in the received data and performs the process according to the determination result. When the request received from the client is not a request to be processed ("NO" in S1217), the relay server 103 returns the process to S1201 and receives the next data.

Specifically, first, the relay server 103 determines whether the request included in the received data is an enter request (support start request). If the received data is an enter request ("YES" in S1202), the relay server 103 issues an entry session ID corresponding to the enter request in Step S1203. As described in FIG. 3 and FIG. 5, the enter request is a POST request which is transmitted to the entry and exit URL and in which "enter" is designated as a parameter. The enter request includes an authentication session ID and a support room ID. The support room ID is an ID for identifying a support room into which entry is requested and is read from the received enter request.

The relay server 103 adds the issued entry session ID to a support room list in association with the support room ID included in the received enter request. The support room list is management information for managing, when the relay server 103 uses a plurality of support rooms, clients that use them using identification information (account). In other words, in the support room list, the operator PC 102 and the image forming apparatus 101 that use a remote support service through the support room are stored in association with each other.

In the support room list, in order to specify the image forming apparatus 101 and the operator PC 102, a transmission source account name included in the enter request is used. The relay server 103 adds the transmission source account name as an account corresponding to the entered support room, that is, a support room ID read from the enter request, to the support room list. The transmission source account name can be searched for based on information about an authentication session ID included in the POST request. Accounts corresponding to the same support room ID are added to the support room list in association with each other.

When the operator PC 102 starts a remote support service for the image forming apparatus 101, the relay server 103 performs the processes based on the association between the account (identification information) of the operator PC 102 and the account of the image forming apparatus 101 created in the process of Step S1203.

Next, in Step S1204, the relay server 103 returns a response (success response) in which the created entry session ID is stored to the client, and returns the process to Step S1201. In the case the client that issued the enter request is the image forming apparatus 101, an inquiry code is included in the response.

In Step S1205, if the request included in the received data is not an enter request (support start request), the relay server 103 performs the process of Step S1205. Then, if the request included in the received data is a support data reception request from the client ("YES" in Step S1205), the relay server 103 acquires the entry session ID from the received data request in Step S1206.

Next, in Step S1207, the relay server 103 verifies the acquired entry session ID. If verification is successful, that is, if the entry session ID is present in the support room list ("YES" in Step S1208), the relay server 103 advances the process to Step S1209. On the other hand, if verification fails ("NO" in Step S1208), the relay server 103 returns the process to Step S1201.

In Step S1209, the relay server 103 acquires data of the support room (support data) corresponding to the acquired entry session ID. Specifically, the relay server 103 acquires data stored in a data buffer related to the support room. When data is acquired, the relay server 103 returns the data to the client in Step S1210, and returns the process to S1201. Here, as described above, the client is the image forming apparatus 101 or the operator PC.

In Step S1205, if the request included in the received data is not a support data reception request, the relay server 103 performs the process of Step S1211. Then, if the request included in the received data is a support data transmission request from the client ("YES" in Step S1211), in Step S1212, the relay server 103 acquires the entry session ID included in the received data request.

Next, in Step S1213, the relay server 103 verifies the acquired entry session ID. If verification is successful, that is, if the entry session ID is present in the support room list ("YES" in Step S1214), the relay server 103 advances the process to Step S1215. On the other hand, if verification fails ("NO" in Step S1214), the relay server 103 returns the process to Step S1201.

In Step S1215, the relay server 103 acquires data (support data) included in the received request. Then, in Step S1216, the relay server 103 stores the acquired support data. Specifically, the relay server 103 stores the data included in the received request as data of a support room corresponding to the entry session ID included in the request in a data buffer related to the support room.

According to the processes of Steps S1206 to S1210 and the processes of Steps S1212 to S1216, the relay server 103 relays communication for the operator PC 102 to remotely support the image forming apparatus 101 through the corresponding support room. Specifically, data for remote support is transmitted and received between the operator PC 102 and the image forming apparatus 101 through the data buffer of the corresponding support room.

Therefore, remote support is realized using audio and video communication, a remote operation according to a VNC protocol, or the like. When the process of Step S1210 or S1216 is completed, the relay server 103 returns the process to S1201.

In Step S1211, if the request included in the received data is not a support data transmission request, the relay server 103 performs the process of Step S1217. Then, if the request included in the received data is an exit request from the client ("YES" in Step S1217), the relay server 103 acquires the entry session ID included in the received request in Step S1218. As described in FIG. 3 and FIG. 6, the exit request is a POST request which is transmitted to the entry and exit URL and in which "exit" is designated as a parameter. The exit request includes an entry session ID. The exit request is a message for requesting exit from the entered support room corresponding to the entry session ID.

In Step S1219, the relay server 103 searches for the entry session ID included in the received request in the support room list and deletes it from the support room list. Then, in Step S1220, the relay server 103 returns a response indicating that the process related to support end is completed to the client. Therefore, the client that has transmitted the request (the image forming apparatus 101 or the operator PC 102) exits from the entered support room, and a connection between the client and the relay server 103 is disconnected. Then, the process of the relay server 103 returns to Step S1201.

Second Embodiment

In the first embodiment, in the cache deletion process (FIG. 7) performed in the operator PC 102, all cache files in a predetermined folder are objects to be deleted. On the other hand, in the present embodiment, only a cache file related to the remote support service is an object to be deleted. A cache deletion process performed in the operator PC 102 which is a difference from the first embodiment will be described below.

Here, since the other processes are the same as those in the first embodiment, descriptions thereof will be omitted. In addition, the network configuration and the hardware configuration itself of the system in the present embodiment are the same as the network configuration (FIG. 1) and the hardware configuration (FIG. 2) according to the first embodiment. Thus, in the present embodiment, components the same as those in the first embodiment will be denoted with the same reference numerals, and descriptions thereof will be omitted.

Figure 8:
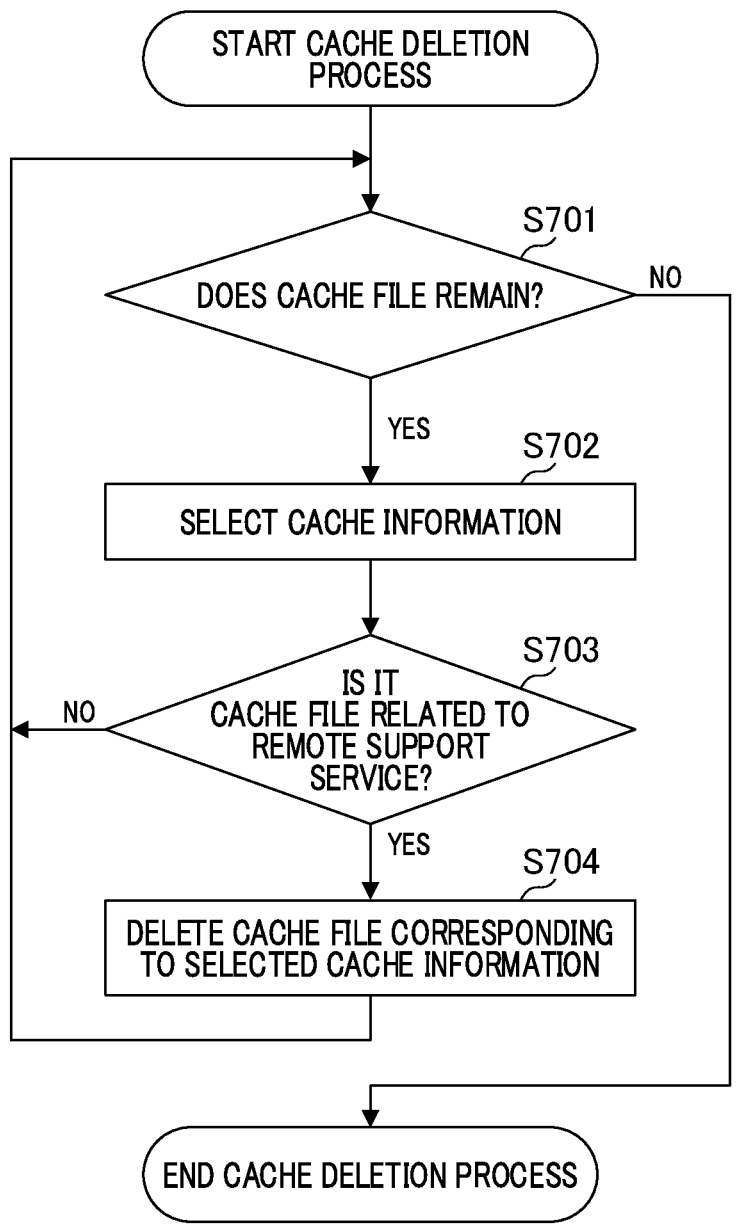
FIG. 8 is a flowchart showing procedures of a cache deletion process performed in an operator PC in a second embodiment.

FIG. 8 is a flowchart for explaining procedures of a cache deletion process performed in the operator PC 102.

The process of steps shown in FIG. 8 is realized in the operator PC 102 when the CPU 221 reads out a program stored in the HDD 224 to the RAM 223 and executes the program. Conditions in which the cache deletion process is performed are the same as those in the first embodiment.

When the cache deletion process in Step S510 or S403 is started as in the first embodiment, first, the operator PC 102 determines whether a cache file remains in a cache file storage folder in Step S701. If a cache file remains, the operator PC 102 advances the process to Step S702, and if no cache file remains, the process ends.

In Step S702, the operator PC 102 selects one cache information item from among cache information items stored in the remaining cache file. Next, in Step S703, the operator PC 102 determines whether the cache file is a cache file related to the remote support service using the selected cache information item. If the cache file corresponding to the select cache information item is a cache file related to a remote support service, the operator PC 102 advances the process to Step S704.

On the other hand, if the cache file corresponding to the select cache information item is not a cache file related to a remote support service, the operator PC 102 returns the process to Step S701.

Here, it can be determined whether the cache file is a cache file related to a remote support service based on URL information included in the cache information item. For example, when the URL information included in the cache information item includes a specific character string, it is determined that the cache file corresponding to the cache information item is a cache file related to the remote support service.

IF the cache file corresponding to the selected cache information item is a cache file related to the remote support service, in Step S704, the operator PC 102 deletes the cache file. Then, the operator PC 102 returns the process to Step S701. Then, the operator PC 102 repeats the processes of Steps S701 to S704 until all cache files related to the remote support service among cache files remaining in the predetermined folder are deleted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-077651, filed Apr. 13, 2018, which is hereby incorporated by reference wherein in its entirety.

What is claimed is:

1. An information processing apparatus configured to provide remote support to an image forming apparatus through a relay server, comprising:
   a memory storing instructions; and
   a processor executing the instructions causing the information processing apparatus to:
      acquire data used for the remote support through the relay server from the image forming apparatus, and
      control execution of a deletion process of the data that is acquired from the image forming apparatus and cached in the information processing apparatus,
   wherein the deletion process of the data is performed when remote support for the image forming apparatus ends and the information processing apparatus exits from a support room which is a virtual space in the relay server used for relaying communication for remote support between the information processing apparatus and the image forming apparatus.

2. The information processing apparatus according to claim 1,
   wherein, when an operation of closing a screen used for remote support for the image forming apparatus is performed in the information processing apparatus, it is determined that remote support for the image forming apparatus ends.

3. The information processing apparatus according to claim 1,
   wherein, when an end notification is provided to a screen used for remote support for the image forming apparatus in the information processing apparatus, it is determined that remote support for the image forming apparatus ends.

4. The information processing apparatus according to claim 3,
   wherein the end notification to the screen is performed when the image forming apparatus is restarted during remote support for the image forming apparatus.

5. The information processing apparatus according to claim 1,
   wherein the deletion process of the data is performed when data cached in the information processing apparatus remains when the information processing apparatus logs into the relay server.

6. The information processing apparatus according to claim 1,
   wherein, in the deletion process, only a file in which a predetermined condition is satisfied among files in a predetermined folder is deleted.

7. A control method for an information processing apparatus which provides remote support to an image forming apparatus through a relay server, the method comprising:
   acquiring data used for the remote support through the relay server from the image forming apparatus; and
   controlling execution of a deletion process of the data that is acquired from the image forming apparatus and cached in the information processing apparatus,
   wherein the deletion process of the data is performed when the remote support for the image forming apparatus ends and the information processing apparatus exits from a support room which is a virtual space in the relay server used for relaying communication for remote support between the information processing apparatus and the image forming apparatus.

8. A non-transitory storage medium on which is stored a computer program for making a computer execute a control method in an information processing apparatus which provides remote support to an image forming apparatus through a relay server, the method comprising:
   acquiring data used for the remote support through the relay server from the image forming apparatus; and
   controlling execution of a deletion process of the data that is acquired from the image forming apparatus and cached in the information processing apparatus,
   wherein the deletion process of the data is performed when the remote support for the image forming apparatus ends and the information processing apparatus exits from a support room which is a virtual space in the relay server used for relaying communication for remote support between the information processing apparatus and the image forming apparatus.

9. A system comprising:
   an image forming apparatus;
   an information processing apparatus that is able to provide remote support to the image forming apparatus; and
   a relay server that relays communication between the image forming apparatus and the information processing apparatus,
   wherein the information processing apparatus comprises:
      a memory storing instructions; and
      a processor executing the instructions causing the information processing apparatus to:
         transmit data used for the remote support to the relay server,
         acquire data used for the remote support from the relay server, and
         control execution of a deletion process of the data that is acquired from the relay server and cached in the information processing apparatus, and
      wherein the deletion process of the data is performed when the remote support for the image forming apparatus ends and the information processing apparatus exits from a support room which is a virtual space in the relay server used for relaying communication for remote support between the information processing apparatus and the image forming apparatus.

* * * * *